United States Patent [19]

Breed et al.

[11] Patent Number: 6,067,528

[45] Date of Patent: May 23, 2000

[54] CONFIDENTIAL MARKET MAKING SYSTEM

[76] Inventors: Craig A. Breed, 6047 NE. 203rd St., Seattle, Wash. 98155; Ian W. Freed, 1930 4th Ave. West, Seattle, Wash. 98119; Bradley B. Furber, 306 Halladay St., Seattle, Wash. 98109; Kelly S. Keenan, 2154 NE. 100th St., Seattle, Wash. 98125; Christopher J. Morse, 530 N. 68th St., Seattle, Wash. 98103

[21] Appl. No.: 08/878,997

[22] Filed: Jun. 19, 1997

Related U.S. Application Data

[60] Provisional application No. 60/020,218, Jun. 21, 1996.

[51] Int. Cl.[7] .................................................... G06F 17/60
[52] U.S. Cl. ................................................ 705/26; 705/1
[58] Field of Search ................................ 705/26, 37, 30, 705/35; 395/200.31, 300.33; 707/1, 9

[56] References Cited

U.S. PATENT DOCUMENTS 3,573,474  4/1971  Adams et al. ............................. 705/37
5,136,501  8/1992  Silverman et al. ....................... 705/37
5,664,115  9/1997  Fraser ....................................... 705/37
5,794,207  8/1998  Walker et al. ........................... 705/23

Primary Examiner—Frantzy Poinvil
Assistant Examiner—Alexander Kalinowski
Attorney, Agent, or Firm—Black Lowe & Graham PLLC

[57] ABSTRACT

A system for allowing users to present themselves to an on-line market with a number of information "veils" which, upon removal, reveal increasing levels of confidential information relating to the business being sold (if a seller) or sought (if a buyer). As prospective buyers (or sellers) consider entering into negotiations with prospective sellers (or buyers), the parties remove the veils one at a time, sequentially affording each complete control over the rate, quantity, and nature of information revealed to the other. The communications are specific between two parties and either party can terminate the communication at any point in the process. Each step is controlled by the user, but executed through the central CBeX System. All veil information concerning system users is directly loaded by the users into the system.

22 Claims, 23 Drawing Sheets

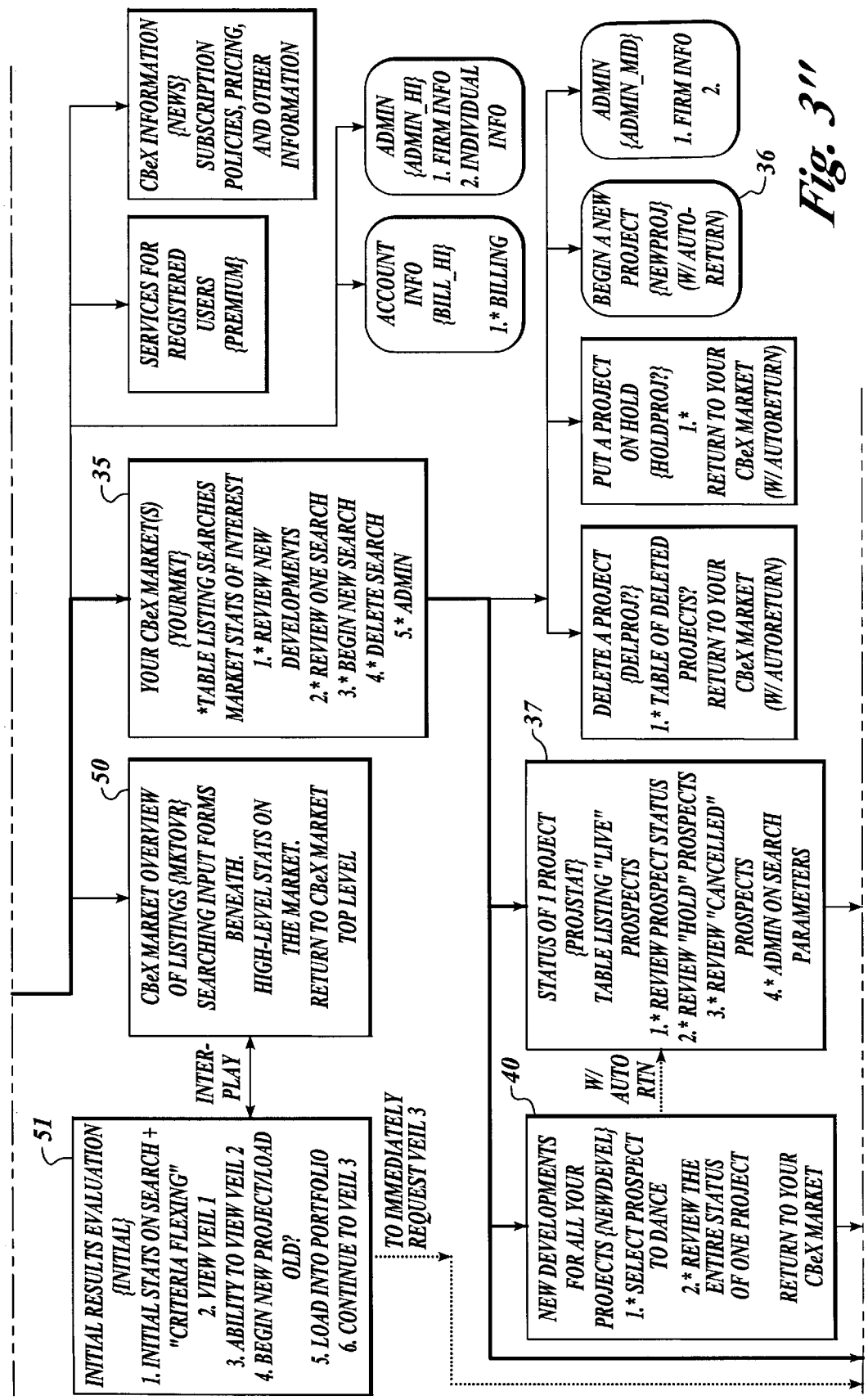
Fig. 3"

Status of one project

CBeX, Inc.
*The Confidential Business eXchange*

Summary of one project

Firm [Microsoft, Inc.]   Member [Gates]

Project [Buy paper comp]

| prospect | High veil | Unread info? | Action req'd? | Your last act | Last review | You |
|---|---|---|---|---|---|---|
| 000000001 | 1 | T | T | 03/10/96 | 02/10/96 | 000 |
| 000000003 | 2 | T | T | 03/10/96 | 02/10/96 | 000 |
| 000000007 | 2 | F | T | 03/10/96 | 02/10/96 | 000 |
| 000000009 | 3 | T | T | 03/10/96 | 02/10/96 | 000 |

To your CBeX market    [0000000001]

Prospects on Hold for Buy paper comp

Previously discarded prospects    Review listing or search criteria (not hooked up yet)

Dance of the Seven Veils page 3 thisform.parm1

CBeX, Inc.
*The Confidential Business eXchange*

Next Steps: — *41d*

◉ Send a fax or message to other side
○ Continue with the Dance
○ Discard prospect
○ Hold prospect for later consideration

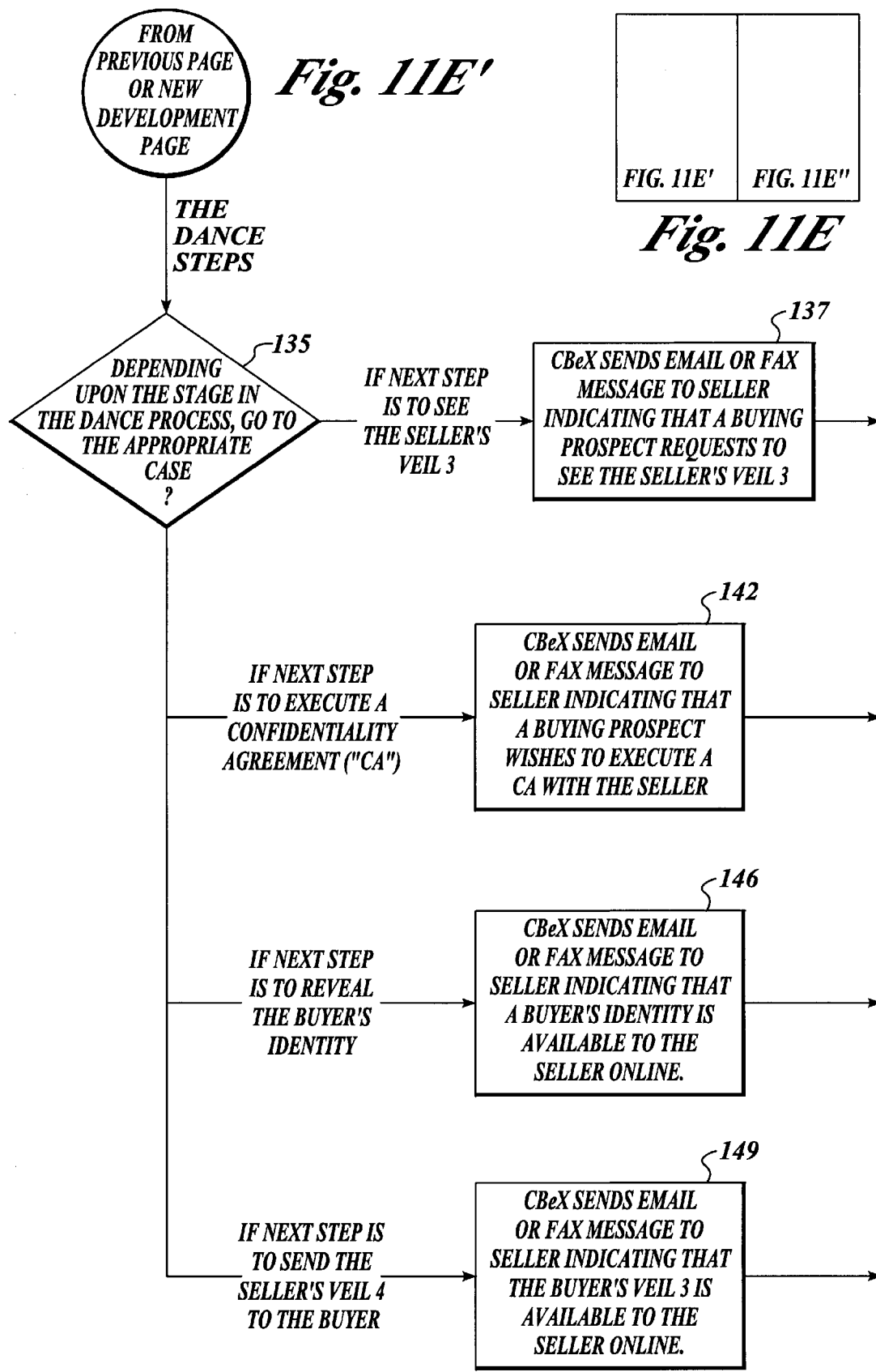

CONFIDENTIAL MARKET MAKING SYSTEM

This application claims priority from U.S. Provisional Application Ser. No. 60/020,218, filed Jun. 21, 1996.

FIELD OF THE INVENTION

This invention relates to methods and apparatus for providing a confidential marketplace for buyers and sellers and, more particularly, methods and apparatus for efficiently executing M&A transactions without compromising the confidentiality of parties involved or the unauthorized release of information.

BACKGROUND OF THE INVENTION

No effective marketplace currently exists for the mergers and acquisitions of privately owned small to mid-sized companies. Market participants often wish to maintain a level of secrecy about their efforts to buy or sell such companies. Their concern for secrecy usually arises from the possible negative reactions a company's employees, bankers, suppliers, customers and others might have if the effort or interest to seek a transaction were to become known. This need for secrecy has thus far thwarted the emergence of a public forum or marketplace to serve as a clearinghouse for this large volume of business.

At present, the process by which a company is bought or sold is difficult, slow, and expensive. A transaction typically requires six to nine months and involves many steps. Locating parties with whom to conduct a transaction is one step in the overall process and is perhaps the most difficult one. Qualified and interested buyers of multimillion dollar corporations are hard to find. It is even more difficult to bring a number of them forward simultaneously during negotiations. Potential acquirers in industry simply are not able to effectively "monitor" the economy at large for acquisition opportunities even though some may fit well within their company's operations or plans.

An industry of professional "middlemen" (known variously as intermediaries, business brokers, and investment bankers) exists to facilitate M&A transactions. These professionals are expensive and generally resort to previously established personal contacts, direct calling campaigns, and placing advertisements in various media. In servicing their clients, they attempt to create a one-time market for a one-time transaction. Many but not all transactions use intermediaries on one or both sides. Despite best intentions, intermediaries are inefficient because of the slow and limiting nature of having to rely heavily on telephone communications. Many phone calls fail to contact with the intended party. Busy executives tend to be impatient when dealing with sales calls concerning opportunities in which they have no interest. These marketing problems are typical of any private negotiated markets.

The effects of the market inefficiencies on this important sector of the economy are detrimental. Beyond the intermediary's high fees, the current process for mergers and acquisitions has the effect of causing private companies to sell at a significant discount relative to what the same company might sell for were it publicly owned and traded on a functioning exchange. An important and large sector of the entire economy is held back by the difficulty in conducting corporate M&A (and also in raising equity or debt capital). Furthermore, it is likely that since privately held companies are so difficult to sell they are not sold as often as they might or should be.

Previous attempts to streamline the M&A process through computers have failed to succeed on a large scale because they have been mere "bulletin boards"—static information that advertises one firm's opportunities. Users must still seek other sources for opportunities just as if the bulletin board were not electronic. A "multiple listings service" concept has not been applicable to M&A due to the need for confidentiality. The present invention is directed to overcoming the foregoing and other disadvantages. More specifically, the present invention is directed to providing a method and apparatus for efficiently executing M&A transactions without compromising on the confidentiality of parties involved or on the unauthorized release of information.

SUMMARY OF THE INVENTION

The present invention improves the efficiency of the mergers and acquisition market by combining a widely reaching electronic system with interactivity to create a public information sharing forum where users have full control over the release of their sensitive information.

The present invention allows users to present themselves to the on-line market with a number of information "veils" which, upon removal, reveal increasing levels of confidential information relating to the business being sold (if a seller) or sought (if a buyer). As prospective buyers (or sellers) consider entering into negotiations with prospective sellers (or buyers), the parties remove the veils one at a time, sequentially affording each complete control over the rate, quantity, and nature of information revealed to the other. The communications are specific between two parties and either party can terminate the communication at any point in the process. Each step is controlled by the user, but executed through the central CBeX System. All veil information concerning system users is directly loaded by the users into the system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 4–8, 9A–9C and 10A–10C are screen shots of the user interface of the present invention.

DETAILED DESCRIPTION OF THE PREFERRED EMBODIMENT

The invention disclosed herein relates generally to an interactive on-line mergers and acquisition (M&A) computer system. The M&A computer system enables buyers and sellers of private companies to efficiently find each other and allow them to engage in preliminary and confidential dialogues with one another. The system acts as a veiled communications system for use in the mergers and acquisitions of middle-to-small-sized companies and is primarily designed for use over a public data network, such as the Internet. The system incorporates other traditional forms of media, such as faxing, E-mail, and surface mail, for making communication over the public data network more effective.

Presently, confidentiality is of utmost importance during the early stages of negotiating mergers and acquisitions of private companies. Each party in the M&A process requires extreme confidentiality during the discovery phase when each company is tying to determine if it is in their company's interest to enter into a transaction with the other company. The present invention provides a system by which, without compromising the requisite confidentiality, M&A buyers and sellers present themselves to others on a public data network. On this system, users present themselves using confidential "veils" that, upon removal, reveal increasing levels of confidential information relating to the business and identity of the user. Successive veils reveal increasing amounts of increasingly sensitive information about each party. As prospective buyers (or sellers) consider entering into negotiations with prospective sellers (or buyers), the parties each remove veils one at a time, sequentially affording each complete control over the rate, quantity and nature of information revealed to the other. At any point in the process, either party can terminate the communication.

Figure 1A:
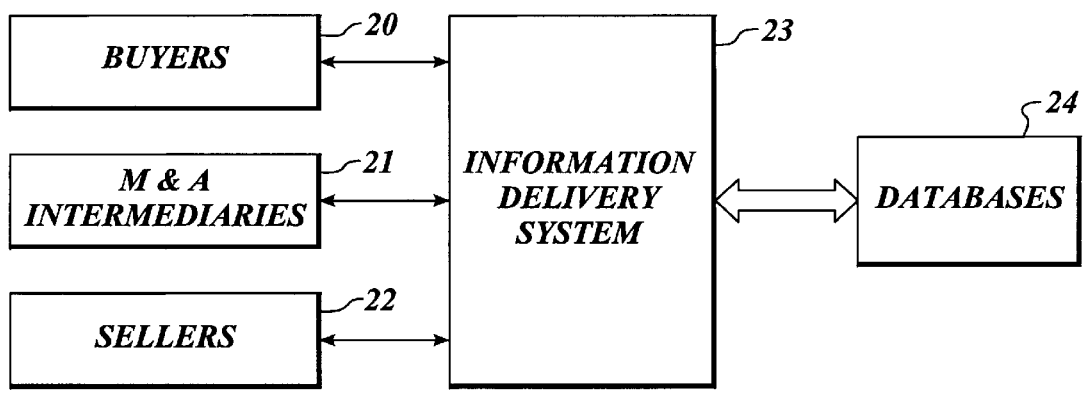
FIG. 1A and 1B are system block diagrams of the present invention.

FIG. 1A illustrates a preferred embodiment of the present invention. Users of this system include buyers 20, M&A intermediaries or brokers 21, and sellers 22. The system includes an information delivery system 23 that interacts with predefined relational databases 24. Each user (member) has interactive access with the information delivery system 23, thus allowing interaction with the databases 24. The information delivery system 23 is described in more detail below with FIGS. 4–11. The databases 24 are described below with FIG. 2, and the information delivery system interaction with the databases 24 is described below with FIGS. 4–10.

This system is not limited to use in the M&A market. This system is fully effective in any environment that requires certain stages or levels of user confidentiality during communication. Also, the system is designed for use over a public data network to reach a large number of subscribers displaced by great distances, but would be equally effective over various other types of networks.

Figure 1B:
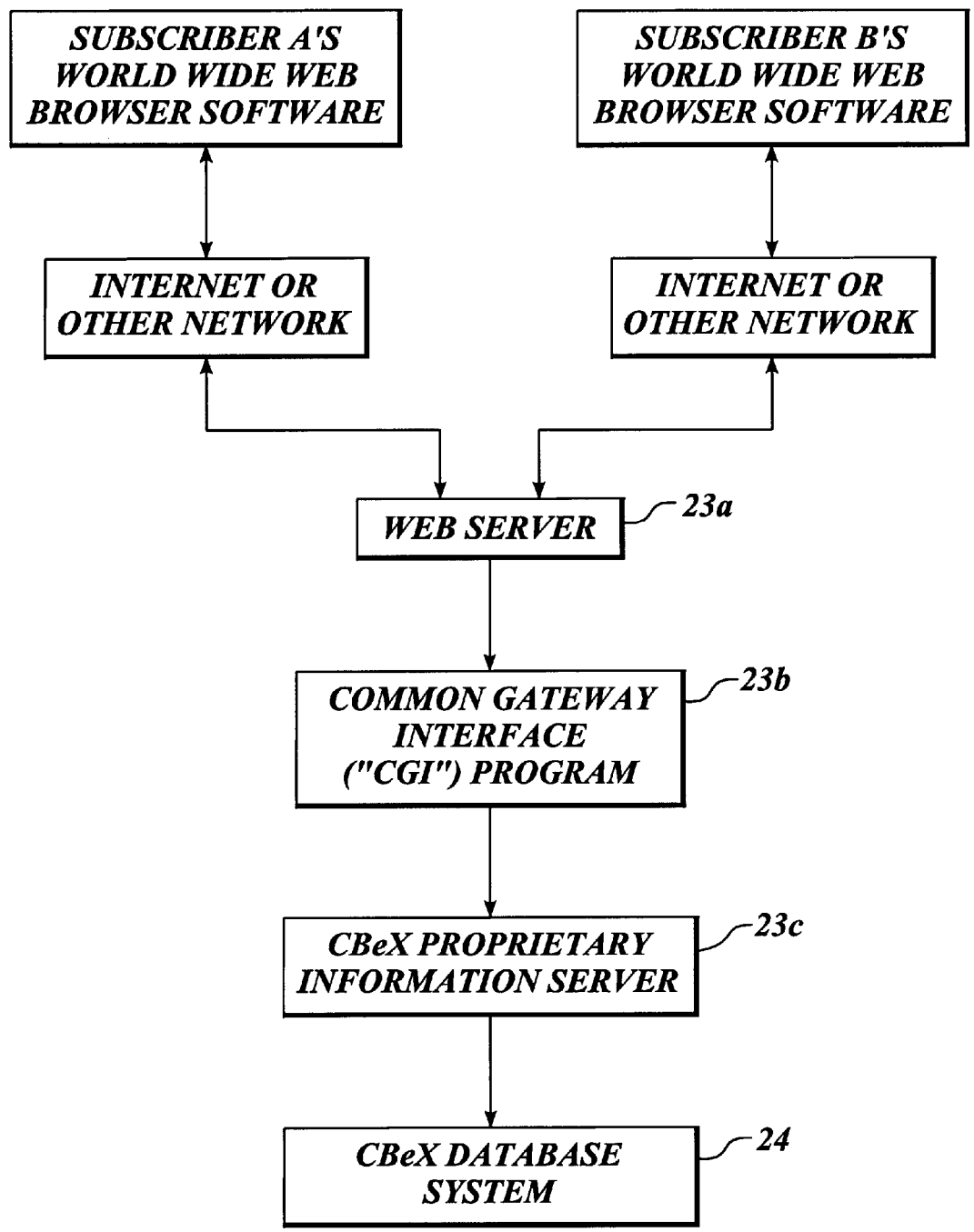

As shown in FIG. 1B, the information delivery system 23 includes a web server 23a, a common gateway interface program 23b or web server Application Program Interface (API), and a proprietary information server 23c. The proprietary information server 23c translates between the relational databases within database system 24 and the common gateway interface program 23b. The common gateway interface program 23b produces HTML web pages for the web server 23a.

Figure 2:
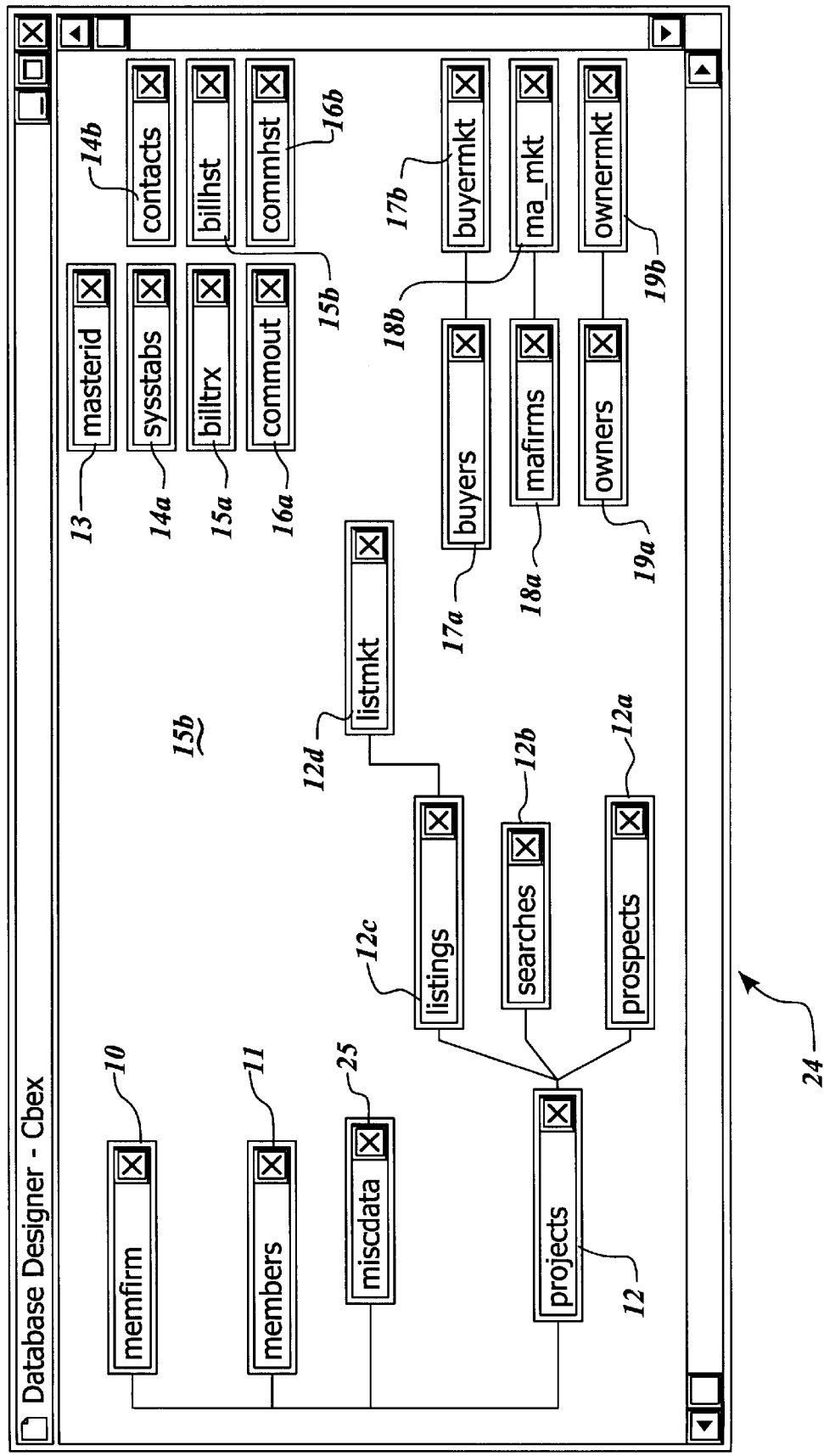
FIG. 2 is a screen shot of corresponding relationships of the databases used in the present invention.

FIG. 2 illustrates the relational databases stored in databases 24 for use with the system 23. The blocks within window 24 of FIG. 2 represent a hierarchy of different databases in a Fox Pro database system, sold by Microsoft. It can be appreciated to one of ordinary skill in the art that any database system similar to Fox Pro could be used for storing the relational databases used by the information delivery system 23. A memfirm database 10 includes information relating to firms or companies that are subscribing members to the system 23. Memfirm database 10 also includes information on the firm's frequency of use, the background data on the firm or company, and any other information deemed important by the operators of the databases 24. A child database of memfirm database 10 is members database 11, which includes names and IDs of individual members of the subscribed firms or companies listed in memfirm database 10 and general information on the individual members. Members database 11 also includes information that tracks each member's usage of the information delivery system 23. Miscdata database 25 includes data relating to members that is stored separately from the members database 11 for efficiency and other reasons. Projects database 12 is a child of members database 11. The projects database 12 stores buying and selling projects of members listed in members database 11. Examples of the types of information stored in a projects database 12 is shown and described below with FIG. 6. A first child database of the projects database 12 is the prospects database 12a. Prospects database 12a includes the status of dialog between the member identified from the members database 11 and the buying or selling prospect company the member is viewing, described in more detail below with FIG. 7. Prospect database 12a also includes data for new developments, described in more detail below with FIG. 8. Searches database 12b is also a child database of projects database 12. The searches database 12b includes criteria information used by the member during company exploring searches, described below with FIGS. 10A–C. The listings database 12c is the third child database of projects database 12. A listings database 12c includes company listing information of all companies interested in either buying or selling. The listings database 12c stores company information in a sequential veil format. The veil format includes succeeding levels of information, wherein each level of information reveals more data about the company it describes, described in more detail below with FIGS. 9A and 9B. Listings database 12c can also list a single project in a multiple of differently accessible ways. Listmkt database 12d is a child database of listing database 12c. Listmkt database 12d includes information of accesses to the listings in the listing database 12c.

Also shown in FIG. 2, masterid database 13 includes unique tracking variables that mark and store accesses within the previously mentioned databases. These unique tracking variables are used by the system for database linkng. The sysstats database 14a maintains statistics with regard to the system 23. The billing databases 15a and 15b maintain billing information of the member companies or firms and individual members. Billtrx database 15a maintains current billing information and billhst database 15b maintains a billing history of members and member firms. Communication databases 16a and 16b store communication jobs initiated during the view veils or dance stage. Commout database 16a maintains current communication output, or jobs, and commhst database 16b maintains a history of member and system communications. Databases 16a, b are used for communication between and to connected members.

A buyer's database 17a, a mafirms database 18a and an owner's database 19a, respectively, include information on all publicly known buyers, M&A firms, and private business owners. These databases also include associated marketing databases 17b–19b. The information contained within the databases 17a–19a may be accessed through the information delivery system 23. However, with respect to these particular databases, users are limited to only cursory searches since the buyers, M&A firms and owners stored in these databases are not presently paying members of the system and the data has been obtained through publicly available sources.

Figure 3:
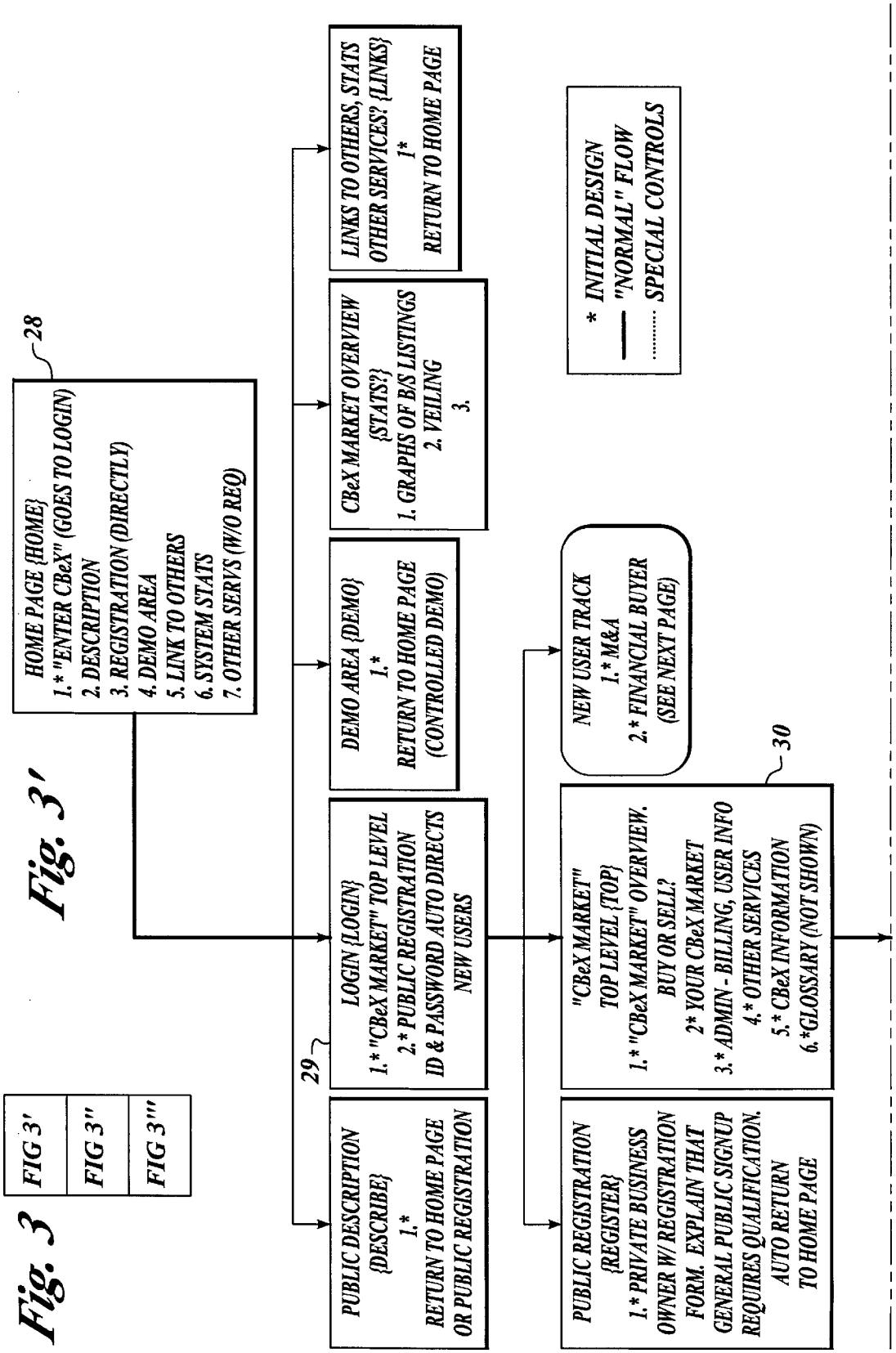
FIG. 3 is an overall system flow diagram.
Figure 3:
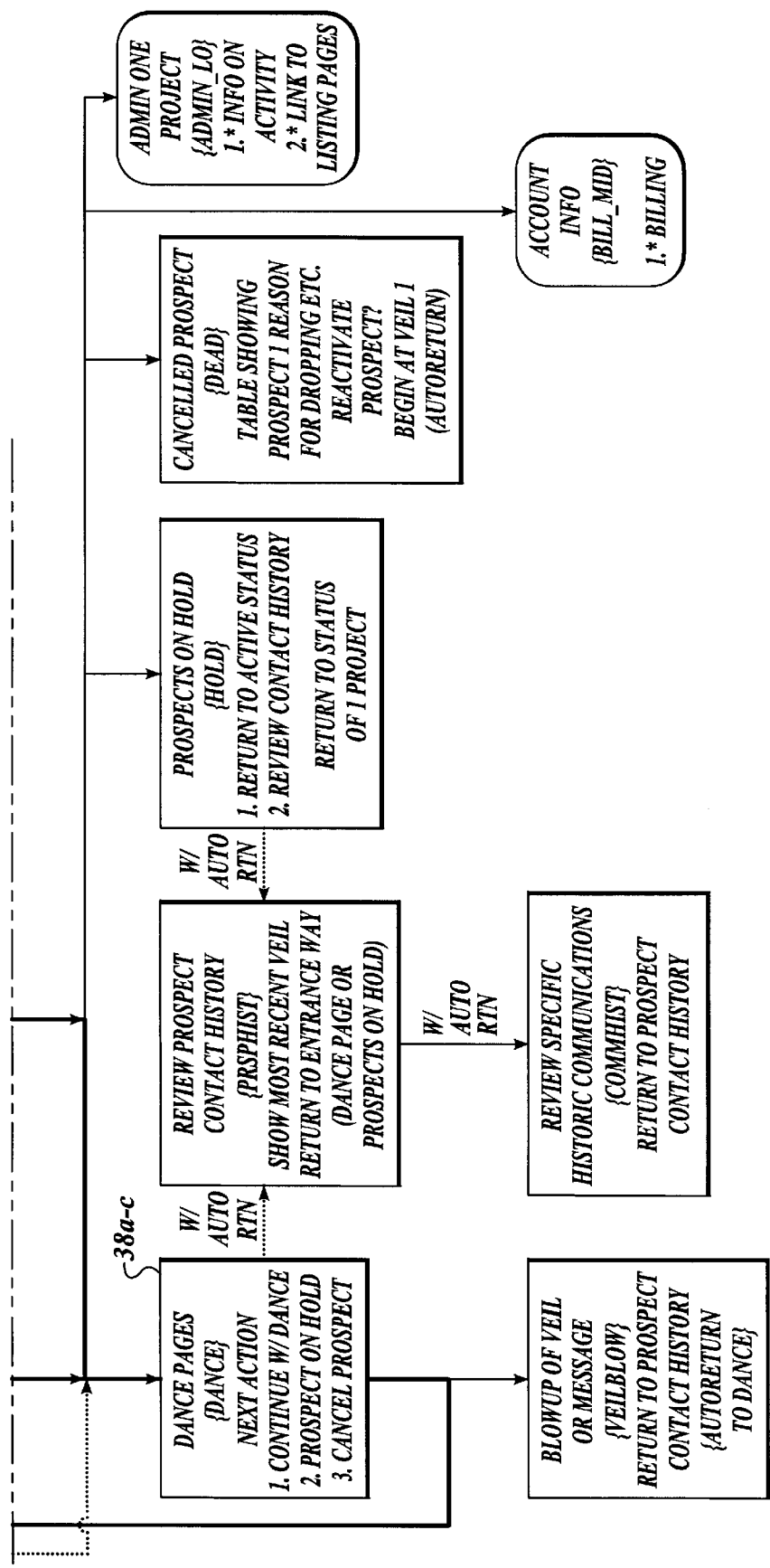

FIG. 3 illustrates a progressive flow of member-accessible programs contained within the system 23. Each of the numbered boxes except for 28 is illustrated in screen shots or multiple screen shots in FIGS. 4–10. According to a preferred embodiment, this invention is implemented over a public data network, such as the Internet. The information delivery system 23 in a public data network environment includes an address, such as a universal resource locator (URL), that provides access to a home page 28. A user viewing the home page 28 is allowed access to a login page 29, a description of the system, registration to the system, demonstration of how the system works, links to other systems, system statistics and other services related to whatever market this system is designed for.

Figure 4:
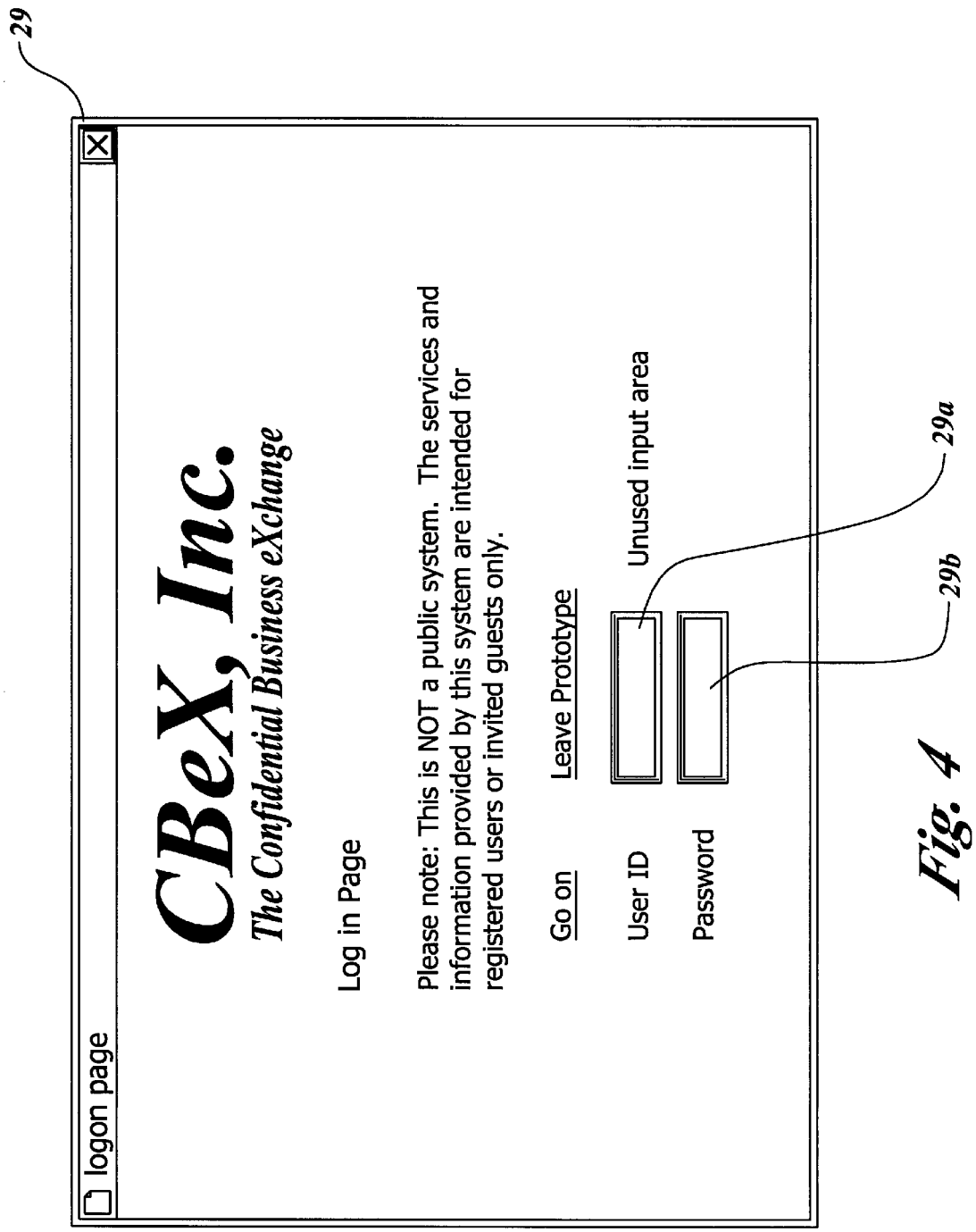
Figure 5:
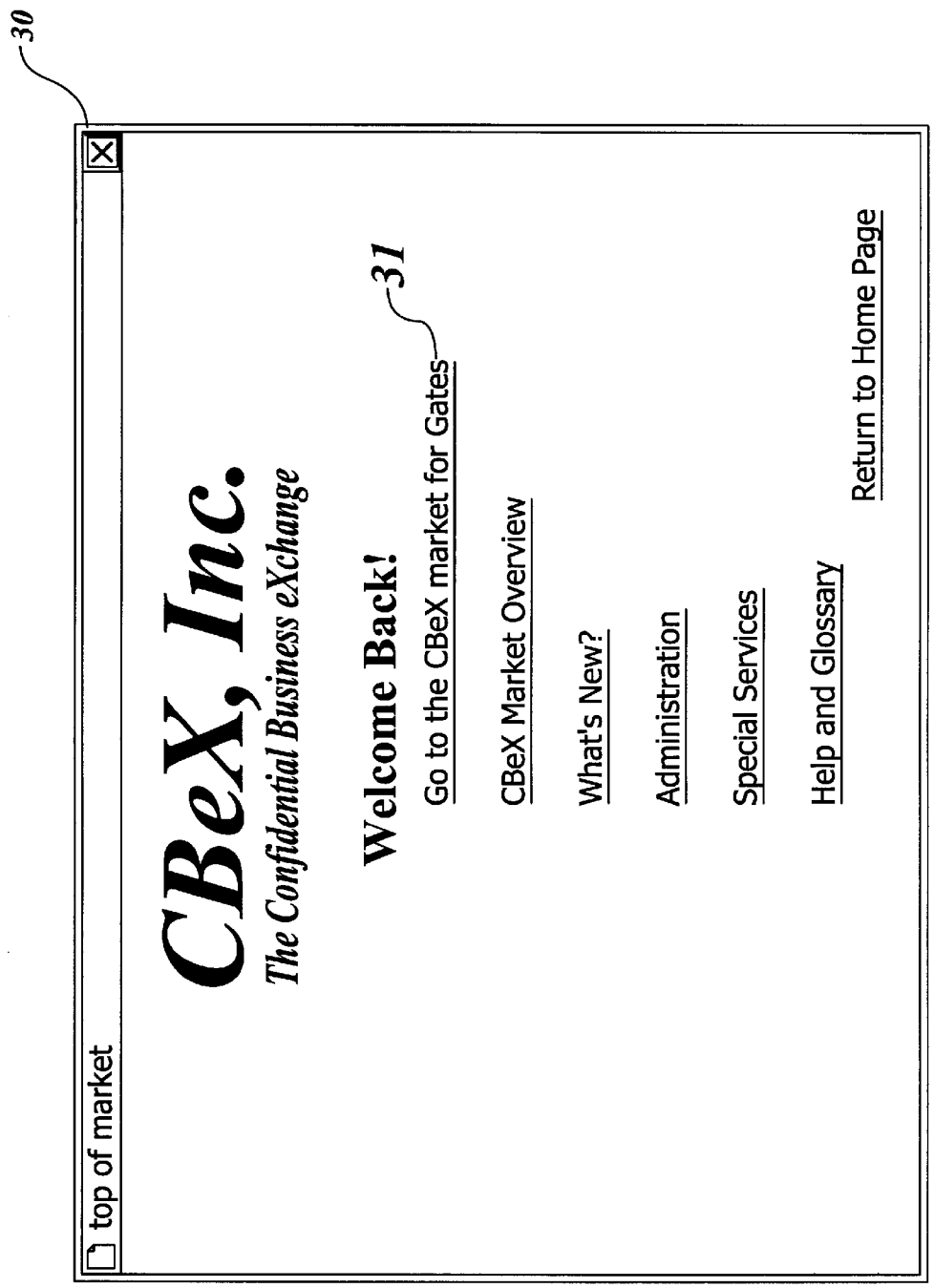

FIG. 4 is a screen shot illustration of the login page 29. Upon registration, members are assigned a user ID and password that allow them access to the system 23. Once a member enters their proper ID and password in blocks 29a and 29b, the member is delivered to the market page 30, as shown in FIG. 5. The system 23 scans the memfirm database 10 and members database 11 to ensure that the entered ID and password in blocks 29a and 29b are correct before allowing the member access. Within the market page 30, the member is provided with selectable options for transporting the member to various interactive windows.

Figure 6:
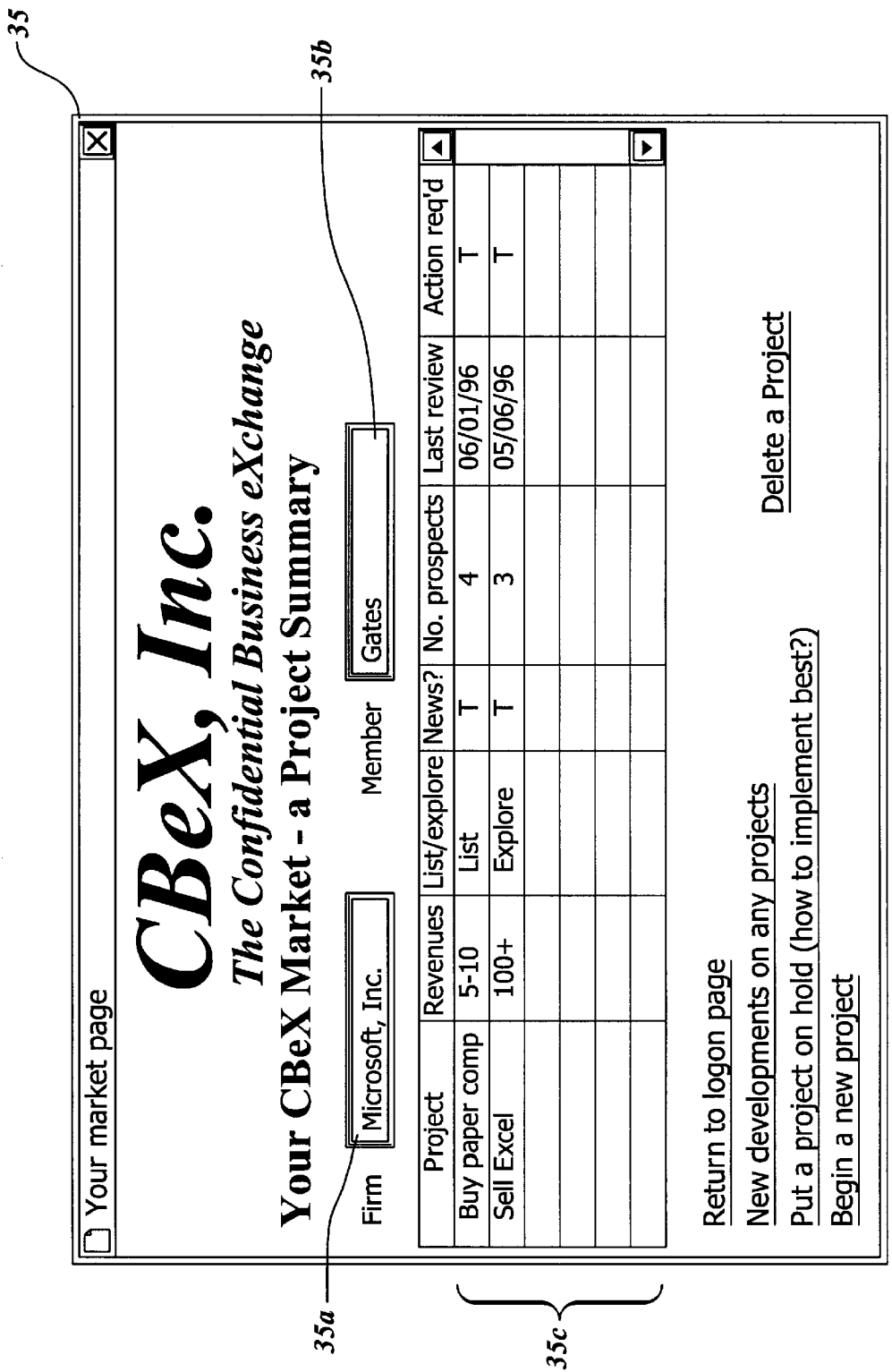

If the user selects a view market page option 31 in a window 30, a market page window 35, as shown in FIG. 6, is accessed and displayed. Market page window 35 displays the name of the firm the member belongs to in field box 35a which is accessed from memfirm database 10. Window 35 also displays the name of the member in field box 35b as accessed from the members database 11. Also projected within market page window 35 is a list of active projects retrieved from projects database 12. A number of variables stored within the projects database 12 are displayed in column form within a projects list section 35c of market page window 35. The variables include project name, revenues of the prospects within the project, a list or explore project, news, number of prospects within the project, last date reviewed and a coded action requirement symbol. The market page window 35 also includes the following options accessible within window 35: return to the login page; view new developments of any projects; place a project on hold; begin a new project; delete a project.

Activation of a project name within the project list section 35c initiates project window 37, as shown in FIG. 7. Project window 37 contains field boxes 37a, b for viewing firm and member name as well as the project name selected in box 37c as accessed from the projects database 12. Included in the projects window 37 is a prospect section 37d that includes a list of prospects of the project. The prospect section 37d includes the following variables: prospect name, number of veils viewed, a true or false display of whether the member has unread information or action required; the date the member last took action; the date the prospect company last took action; member required action or status.

Figure 8:
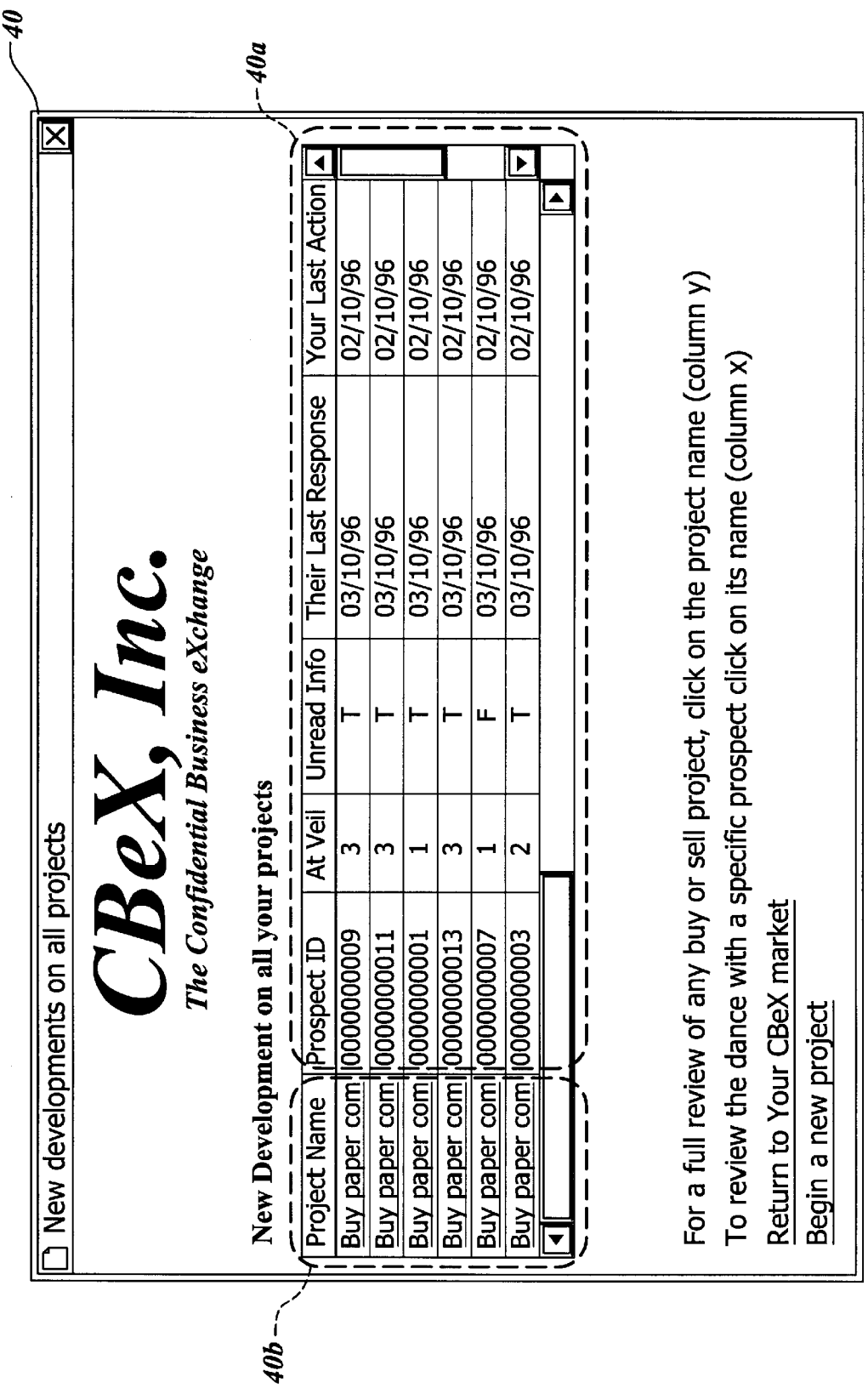

Member selection of a new development choice within market page window 35 provides member access to the new developments window 40, as shown in FIG. 8. The new developments window 40 displays a list of project names 40b that include prospects that require action by the member accessed from projects database 12. The new developments window 40 includes a list of prospect information 40a accessed from prospects database 12a and associated with the project names list 40b. The prospects list 40a includes the prospect name, what veil the member is at, whether or not there is unread information, the date of the last response from the prospect company, the date the member last took action, and the member action required.

Figure 9A:
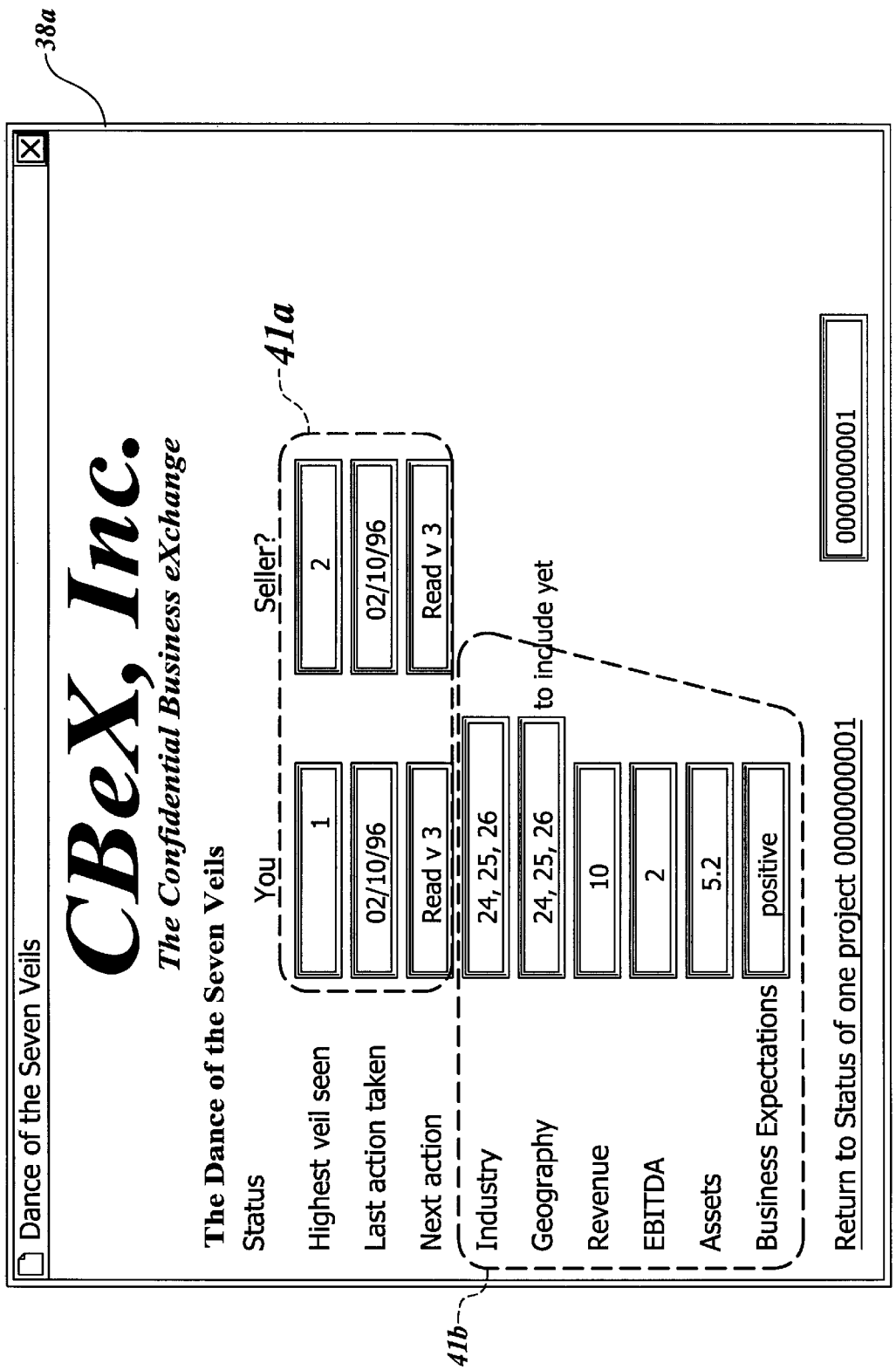
Figure 9B:
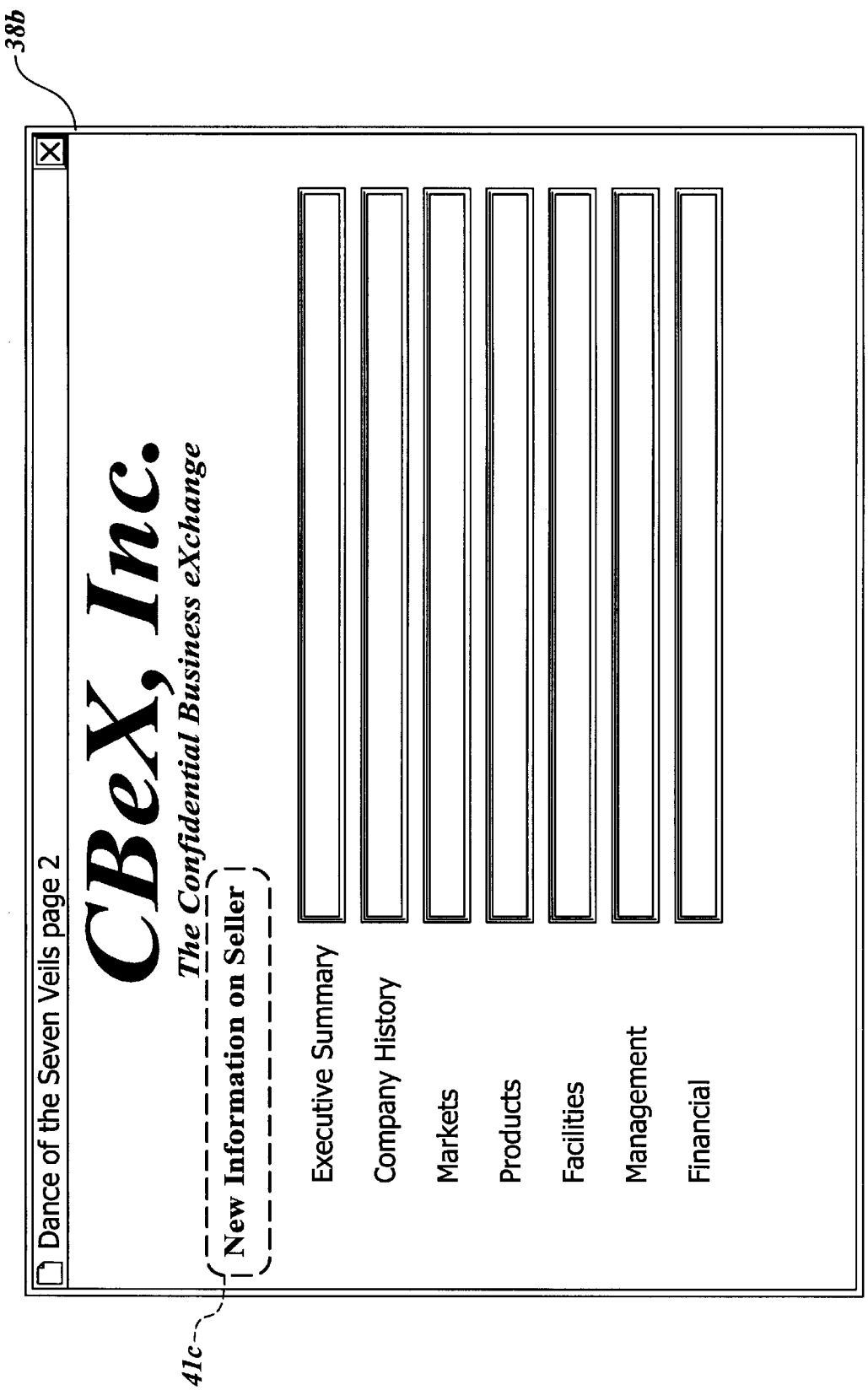

FIGS. 9A–C illustrate the dance or veil viewing pages 38a–c that can be accessed from market window 35, new developments window 40, or project window 37. As shown in FIG. 9A, the first veil viewing window 38a includes a first data section 41a that displays the members' and prospect companies' highest veil seen, date last action taken and next action required. The information for section 41a is retrieved from the prospects database 12a. Also displayed within the first window 38a is section 41b that displays the prospect company's information of the last seen veil (veil 2 as shown in FIG. 9A) as retrieved from the listings database 12c. As shown in FIG. 9B, another veil viewing window 38b displays in section 41c the prospect company's veil information not previously seen (veil 3 as shown in FIG. 9B). The information displayed in section 41c is also retrieved from listings database 12c. The veil 2 information includes SIC codes, geographical location, revenue, earnings before interest, taxes and depreciation (EBITDA), assets, and business expectations of the prospects. Veil 3 includes the prospects' executive summary, company history, markets, products, facilities, management, and finance. The numbers of veils and level of detail of information included in each veil may be altered to satisfy the requirements of the market in which this system is used. The last veil viewing page 38c, as shown in FIG. 9C, allows a member to make the following choices of how to proceed after having viewed the information in windows 38a and 38b: Send a fax or other type message to the prospect company; continue with the veil viewing of information; discard the prospect; hold prospect for later consideration.

Figure 10A:
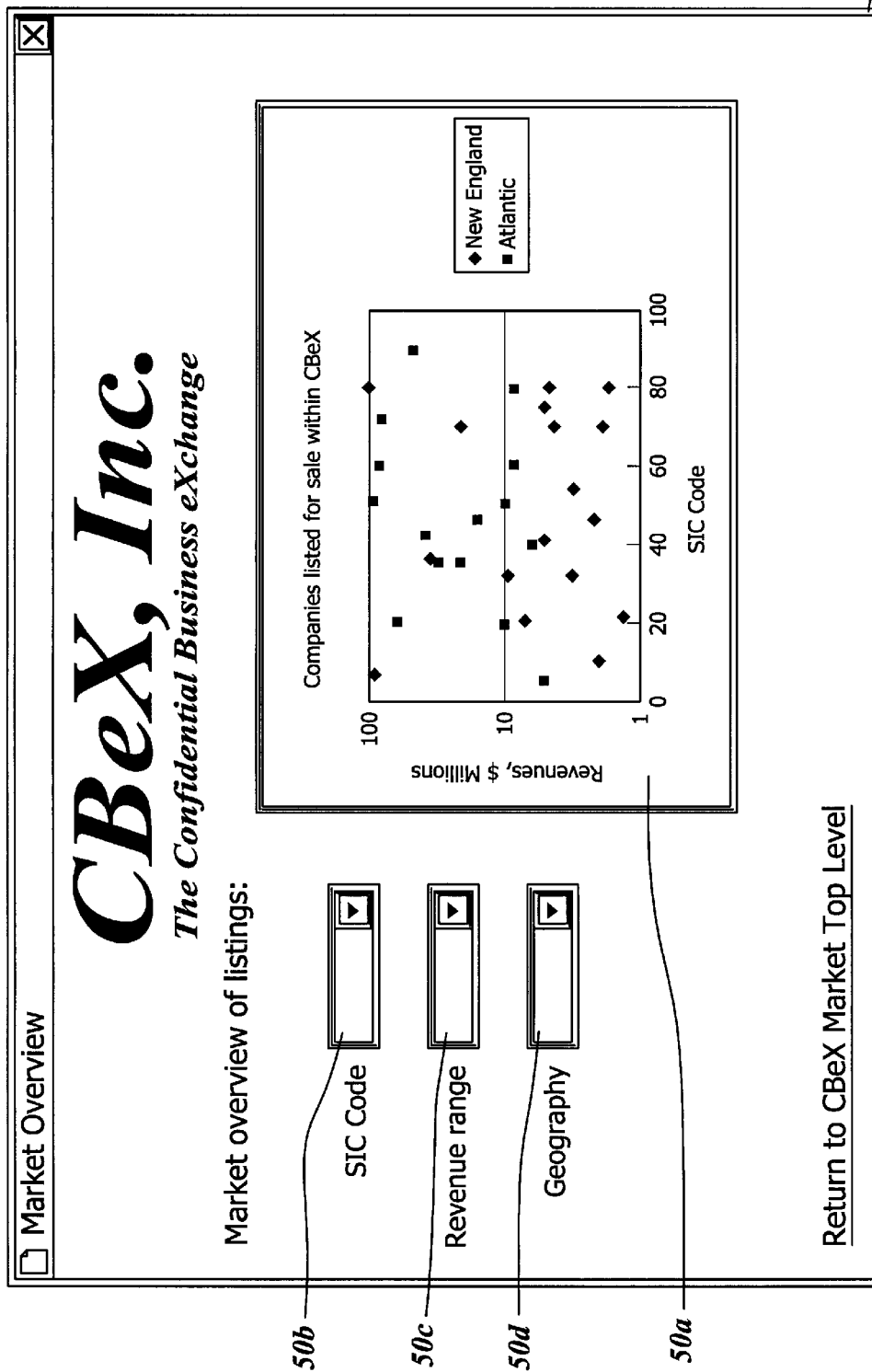
Figure 10B:
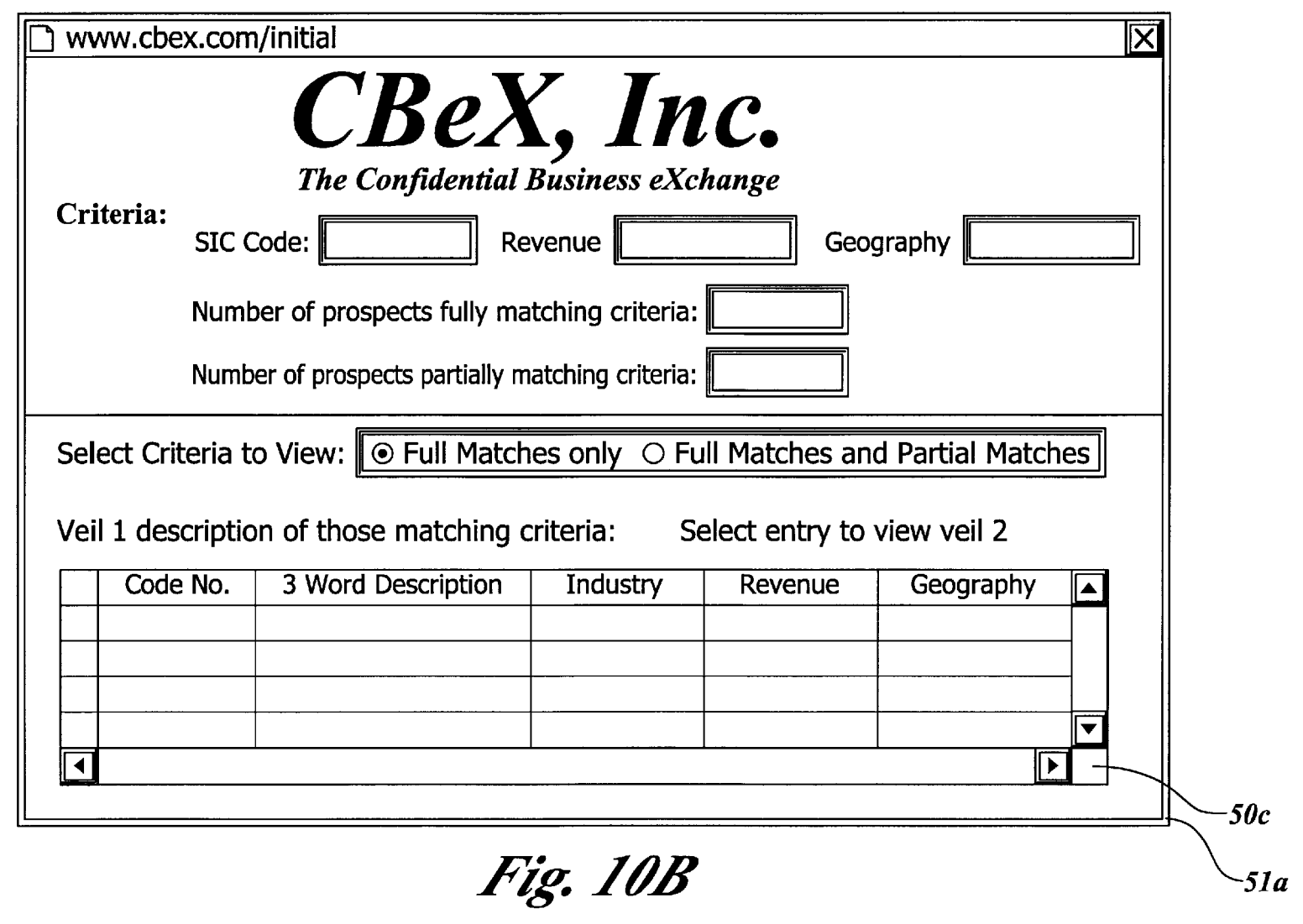
Figure 10C:
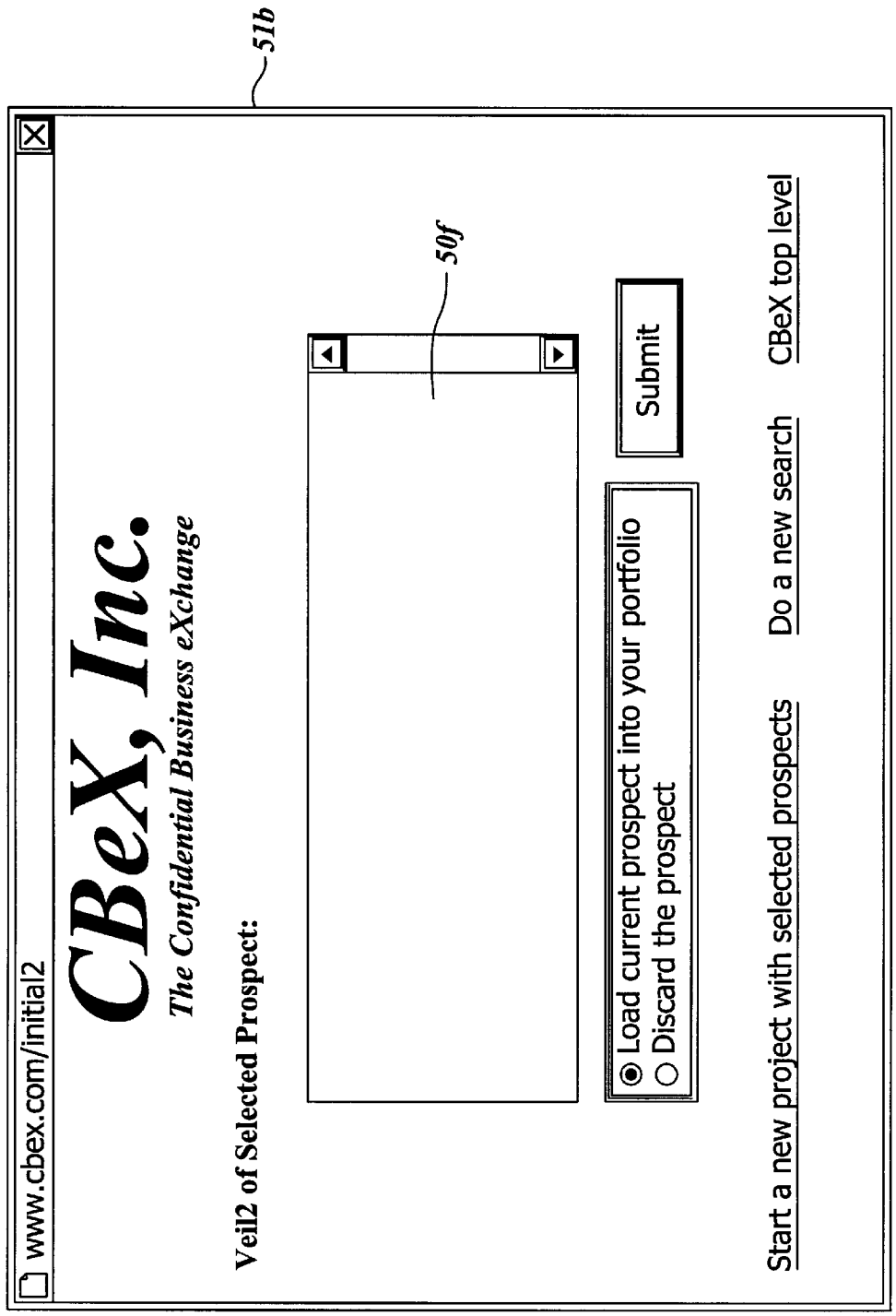

FIGS. 10A–10C are screen shots of boxes 50 and 51 of FIG. 3. As shown in FIG. 10A, market overview window 50, accessible through market window 30, includes main overview section 50a for displaying a market overview of listings within listings database 12c. The market overview graph within section 50a includes the three-variable SIC code on one access, revenue on a second access and various geographical icons. Also within the market overview window 50 are three range fields, SIC code, revenue range, and geography, for allowing a member to define and perform an active search strategy for companies displayed within the graph of section 50a. Once a user inputs values into field blocks 50b–50d, and activates the selections, window 51a is displayed, as shown in FIG. 10B. The search results copy window 51a includes the search strategy initiated in market overview window 50, the number of prospects that fully match the search criteria, and the number of prospects that partially match the search criteria. Also within search results window 51a, the member is provided with a choice of viewing only fully matched prospects or both fully matched and partially matched prospects which are displayed in section 50e. Each prospect included within section 50e includes a code number, a three word description, the industry of the prospect, the revenue of the prospect, and the geographic location of the prospect. The information displayed in section 50e is the veil 1 information stored in the listings database 12c. Activation of any one of the prospects listed in section 50e delivers the member to window 51b, as shown in FIG. 10C. Window 51b includes section 50f that displays the veil 2 information of the activated prospect in section 50e of search results window 51a. The information stored within section 50f is also retrieved from the listings database 12c. Window 51b allows the member to load the current prospect into the member's portfolio, discard the prospect, start a new project with previously selected prospects, do a new search or return to window 30.

The system also provides for passive search of prospects. A passive search window, not shown, is linked to a begin new projects section 36 in FIG. 3. The member enters company parameters of interest into the passive search windows. The entered parameters are saved and used to passively search for matches with listed companies as the companies become available on the system. If matches are discovered, the matched company information is saved as a prospect for the member.

Flow Charts

Figure 11A:
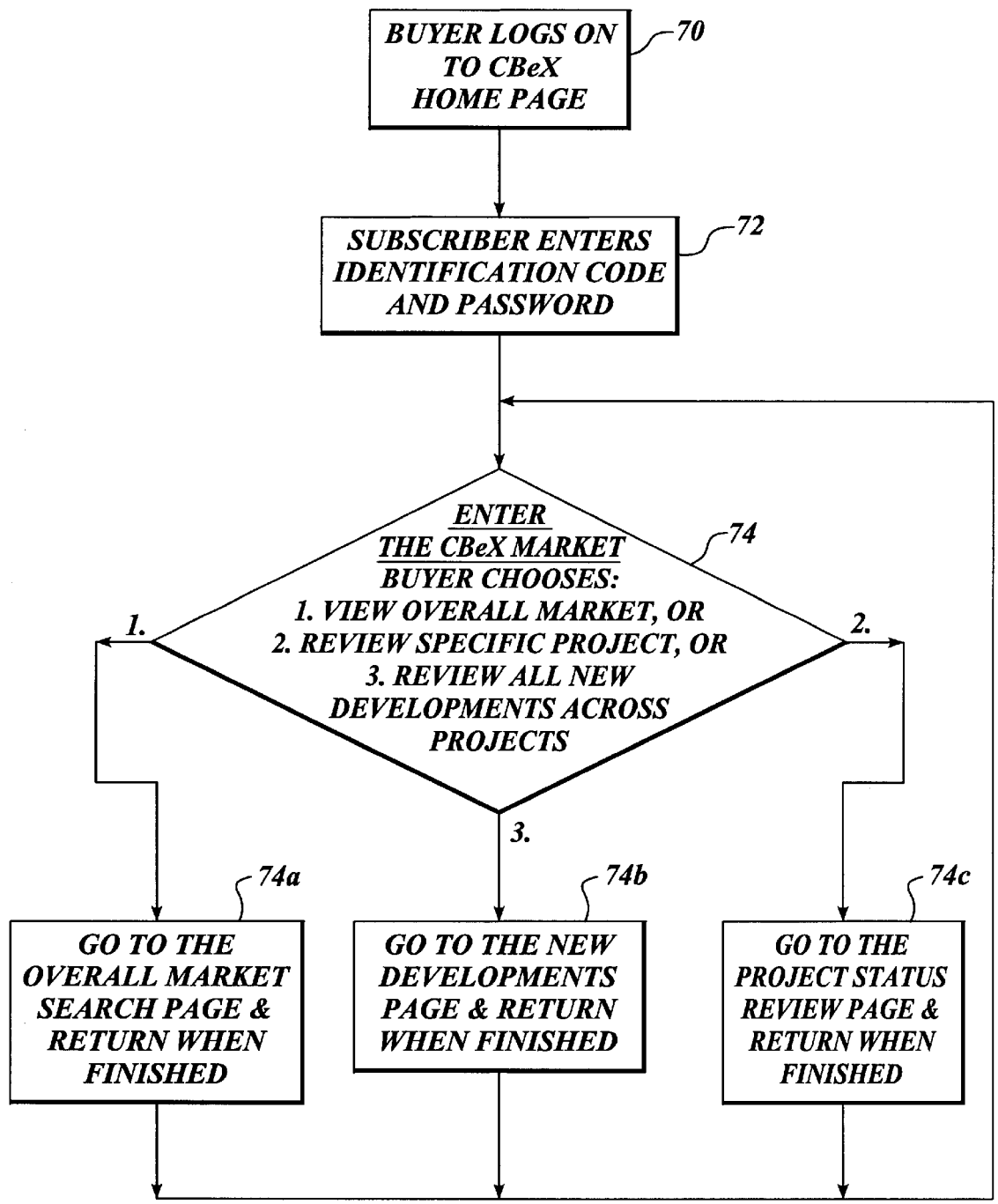
FIGS. 11A–11E are flow diagrams of the present invention.

FIGS. 11A–E are flow diagrams of sequential decisions and actions allowable to a member acting as a buyer. As shown in FIG. 11A, at 70 and 72, respectively, the member/buyer must sign-on to the system and enter a valid identification code and password to initiate the process. At 74, the buyer chooses one of three actions to take: 1. overall market search, at 74a; 2. review specific project, at 74b; 3. review all new developments across projects, at 74c.

Figure 11B:
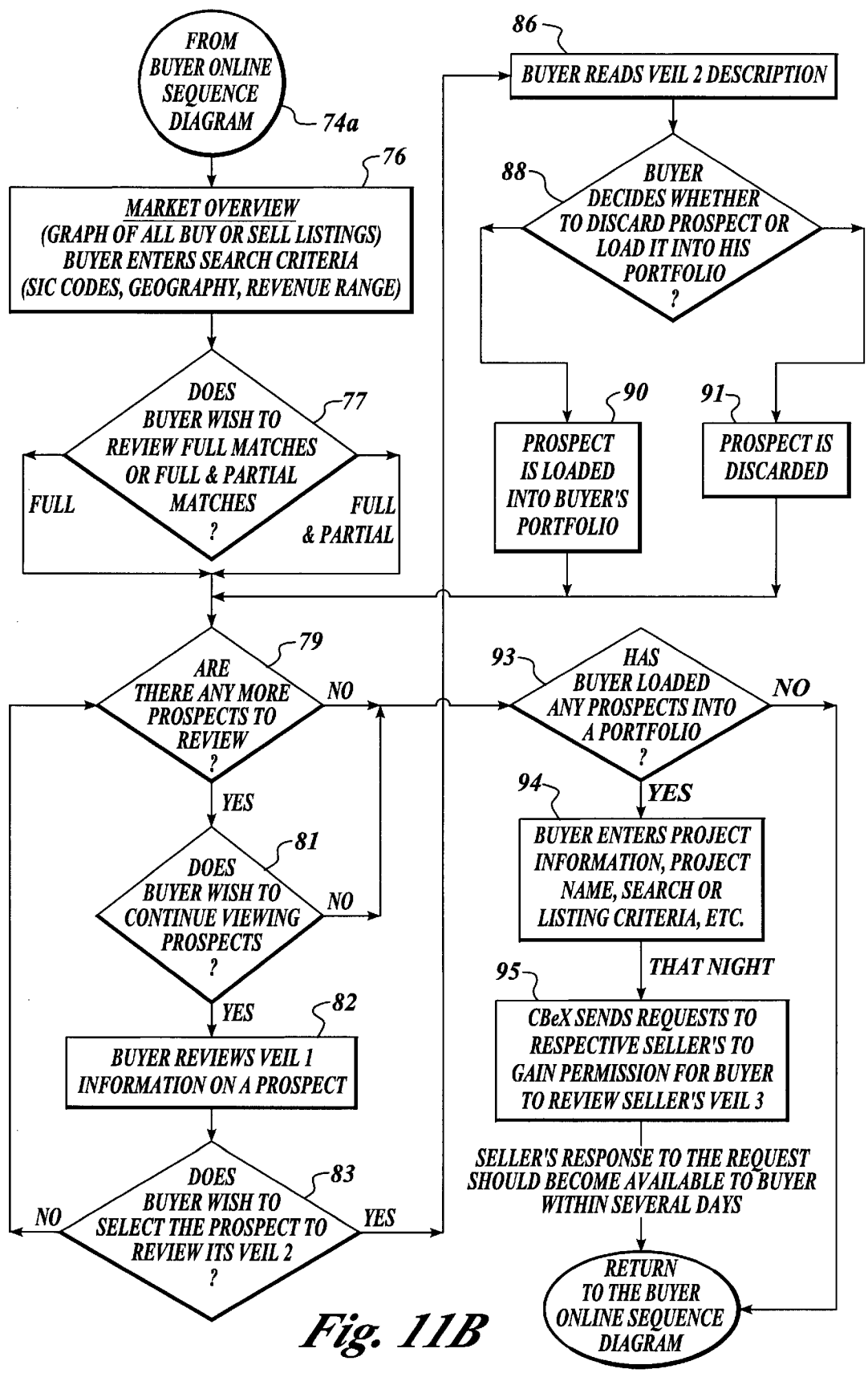

If the buyer chooses the overall market search, a graph of all buy and sell listings is displayed with search capabilities available for the graph, at 76 of FIG. 11B. After the buyer executes a search based on SIC codes, geography and revenue range search criteria, the buyer is given the option of viewing the full or full and partial matches to the search criteria of the search results, at 77. If the buyer chooses to view, the buyer is presented with the first veil of information of a prospect. At 83, the buyer is presented with the option of viewing the second veil of information. If the buyer decides not to view the second veil information, the buyer may choose to review other prospects in the search results, at 79. If the buyer decides to view the second veil information, the veil two information is displayed for viewer reading, at 86. The buyer then has the option to discard, at 90, or store the prospect into the buyer's portfolio, at 91. If the buyer has no more prospects to view, at 79, or the buyer decides not to view any more prospects, the system prepares to exit the overall market search. If the buyer has loaded any prospects into the portfolio, at 93, a project is created with the loaded prospects 94 and fax, e-mail or some other form of communication is used to request permission from the prospect companies, at 95, in the project if the buyer may view that prospect's third veil of information.

Figure 11C:
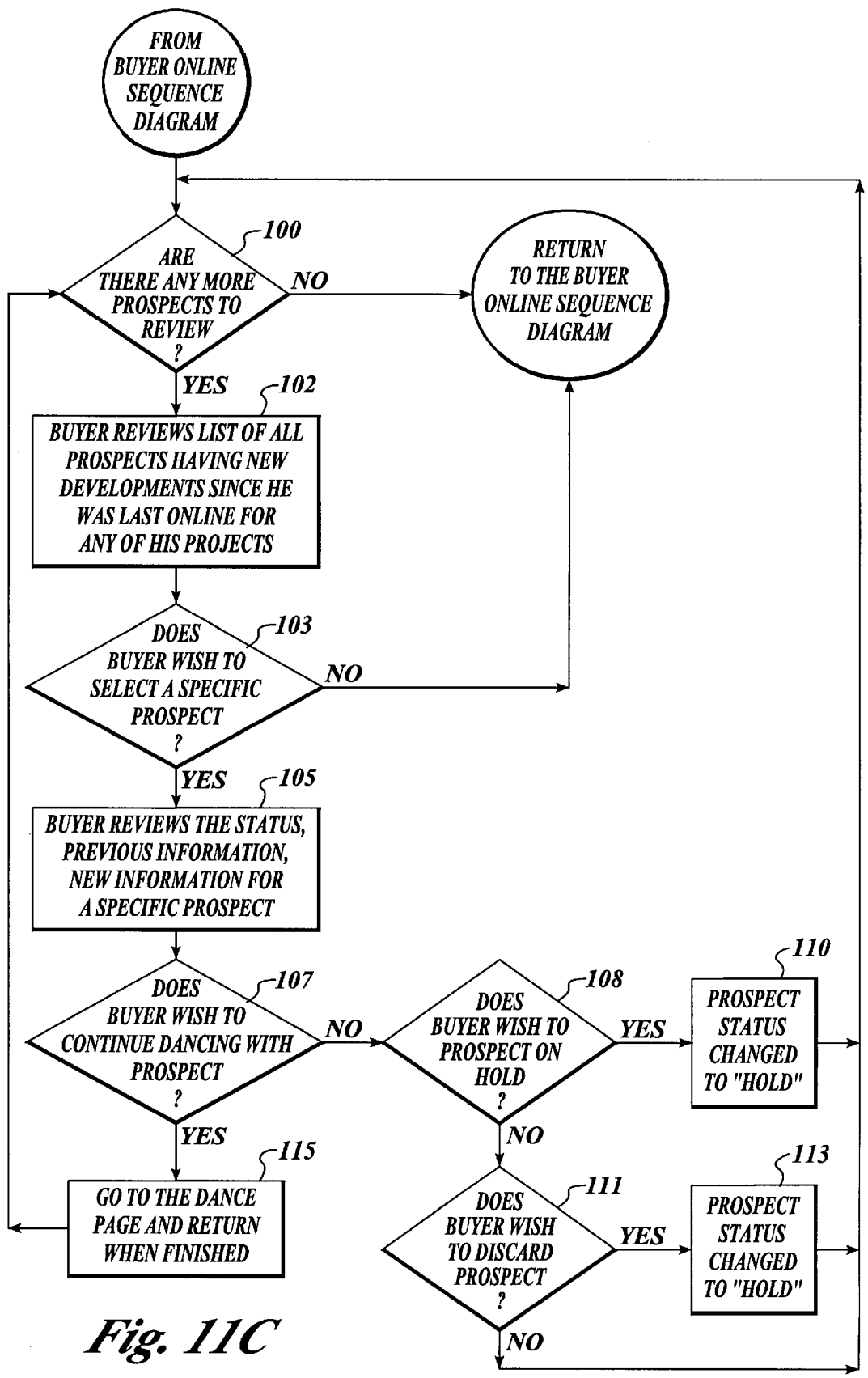

If the buyer selects to review new developments of all projects 74b, the buyer reviews a list of all prospects having new developments since the buyer was last on the system, at 102, as shown in FIG. 11C. The buyer may decide to review the status, previous information and new information for a prospect that has a new development, at 103 and 105. The buyer then has the option to proceed to the dance or view more veil information page, at 107 and 115. The buyer also has the options to place the prospect on hold; at 108 and 110, or discard the prospect, at 111 and 113.

Figure 11D:
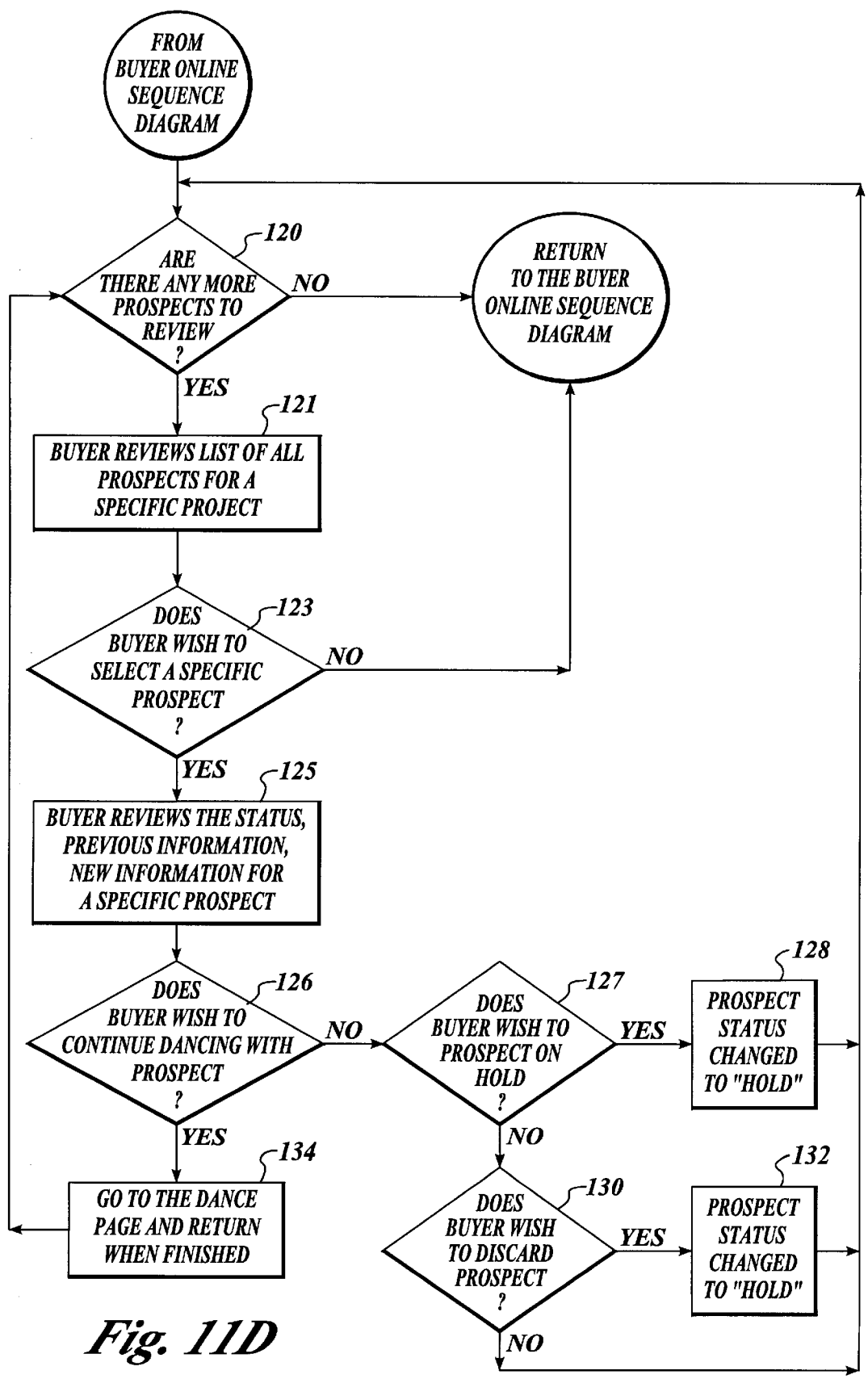

If the buyer selects to review a specific project 74c, the buyer reviews a brief list of all prospects for a specific project, at 121, as shown in FIG. 11D. The other buyer's options are the same as that available under the new developments above.

Figure 11E:
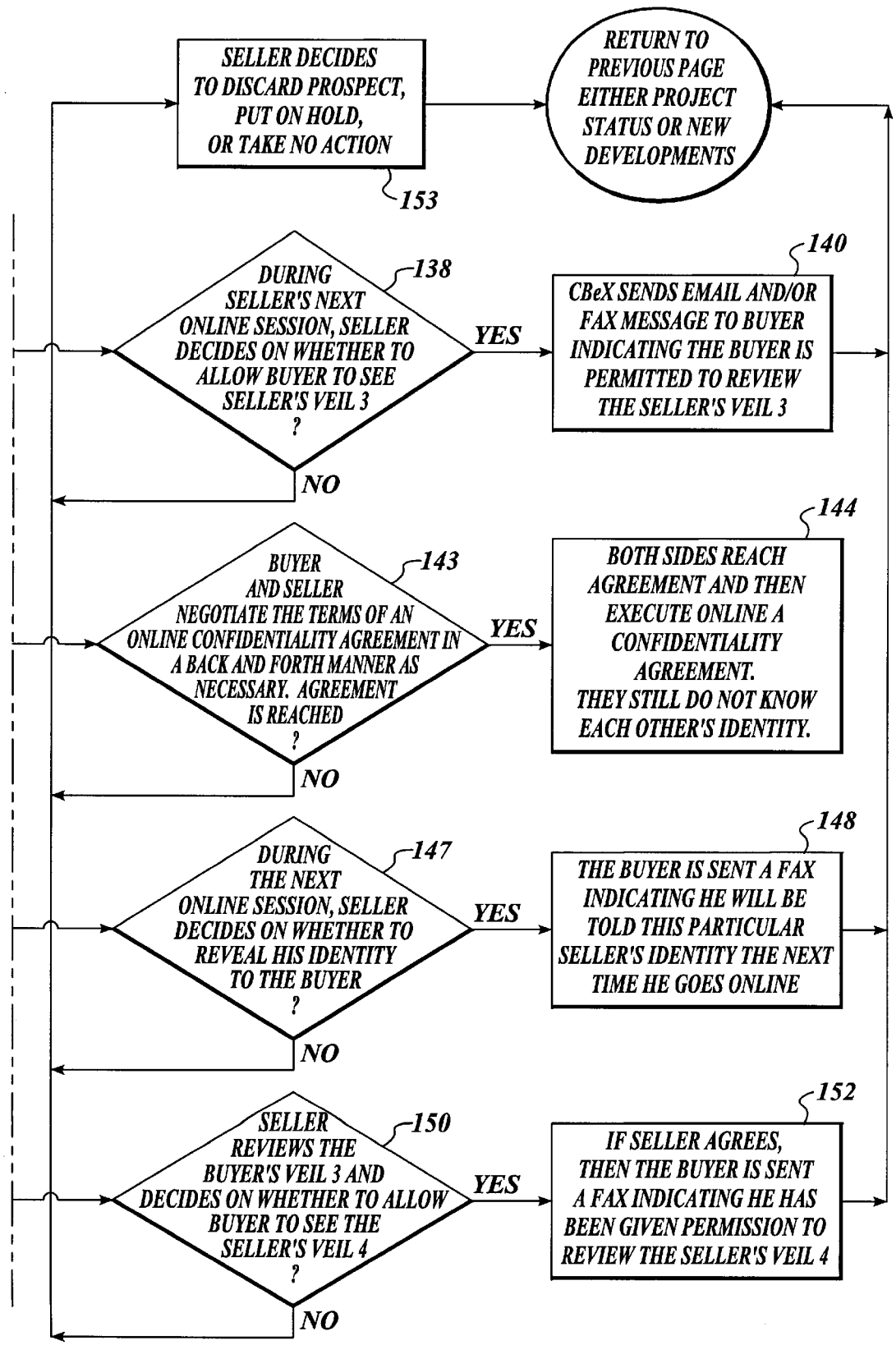

FIG. 11E illustrates the procedures of the dance page accessible through the new developments, the view specific project sections, or market page 35. The operating procedure of the dance page varies according to one of the following four different cases: 1. buyer has not seen the third veil of information of the prospect company/seller, 2. the next step in the communication between the buyer and seller is to execute a confidentiality agreement (CA); 3. the next step is to reveal the buyer's identity to the seller, 4. buyer has not seen a fourth veil of information of the seller. The initial step in each case is to automatically execute an e-mail, fax or regular mail message to either the buyer or seller. In case 1 a message is sent to the seller indicating that a buying prospect requests to see the seller's third veil of information, at 137. The seller then decides to allow the buyer to view the seller's third veil of information, at 138, discard the project, put the project on hold, or take no action, at 153. If the seller decides to allow the buyer to view the seller's third veil of information, a message is sent to the buyer indicating that the buyer is permitted to review the seller's third veil of information, at 140.

In case 2 a message is sent to the seller indicating that a buying prospect wishes to execute a CA with the seller, at 142. Back and forth negotiation between the buyer and seller is performed until the buyer and seller agree to the terms of the CA, at 143. If agreement is reached, the CA is executed on the system 144. If no agreement is reached, the seller may discard the project, put the project on hold, or take no action 153. At this stage, the identities of the buyer and seller have still been withheld from each other.

In case 3 a message is sent to the seller indicating that the buyer's identity is available to the seller over the system, at 146. The seller then decides to allow the buyer to view the seller's identity, at 147. If the seller decides to reveal their identity, a message is delivered to the buyer indicating that the seller's identity is available to the buyer on the system 148. If the seller decides not allow the buyer to view their identity, the seller may discard the project, put the project on hold, or take no action 153.

In case 4 a message is sent to the seller indicating that the buyer's third veil of information is available to the seller over the system 149. The seller reviews the buyer's third veil of information and decides to allow the buyer to see the seller's fourth veil of information 150. The fourth veil of information 150 includes a business plan, selling memorandum or a document that reveals similar information. A message indicating the seller has given permission for the buyer to view the seller's fourth veil of information view is sent to the buyer, if the seller so wishes 152. If the seller decides not to allow the buyer to view this veil, the seller may discard the project, put the project on hold, or take no action 153.

The present invention can be readily modified (requiring only minor changes) for other markets similarly having the simultaneous need for confidentiality. Other appropriate markets would be debt financing markets of various types and also capital raising markets.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for allowing buyers and sellers of business said buyers and sellers having computer servers connected via a network, said network comprises a redefined database, to interact without revealing significant information to an interested buyer or seller without proper authorization, said method comprising the steps of:

entering search information by a prospective buyer based on a first level of seller information, wherein at least one level of one or more seller's information being previously stored in the database;

searching previously stored seller information within the database in accordance with the entered search information;

displaying the first level of one or more seller's information in accordance with the search;

selecting one of the sellers in accordance with the displayed first level of seller information;

displaying a second level of information of the selected seller;

automatically sending an electronic request for more information from the selected seller, if the prospective buyer requests more information;

displaying buyer information to the selected seller, if the seller receives an electronic request from the buyer, said buyer information being previously stored in the database; and displaying a third level of seller information to the buyer, if the seller approves of the displayed buyer information and provides the buyer viewing authorization.

2. The method of claim 1, wherein the first level of information includes the seller's SIC code, geographic location(s), and revenue and the second level of information includes asset information, business expectations and earning before interest, taxes and depreciation data.

3. The method of claim 1, wherein the electronic request is one of an electronic facsimile or electronic mail.

4. The method of claim 1, wherein the step of displaying buyer information to the selected seller, if the seller receives an electronic request from the buyer for more information, further comprises displaying first and second levels of buyer information to the seller, if the electronic request occurred after the buyer has viewed the second level of seller information.

5. The method of claim 4, wherein the step of displaying the requested information to the buyer, if the seller approves of the displayed buyer information and provides the buyer authorization, further comprises displaying the third level of seller information to the buyer if the seller approves of the displayed first and second levels of buyer information and provides the buyer authorization.

6. The method of claim 5, wherein the step of automatically sending an electronic request for more information from the selected seller according to a buyer's request for more information, further comprises sending an electronic request for executing a confidentiality agreement with the selected seller.

7. The method of claim 6, wherein the fourth level of information includes at least one of a complete business plan or selling memorandum.

8. The method of claim 5, wherein the step of automatically sending an electronic request for more information from the selected seller according to a buyer's request for more information, further comprises automatically sending an electronic request for a fourth level of seller information, if the buyer requests more information beyond the third level of seller information.

9. The method of claim 8, wherein the third level of information includes an executive summary, company history, markets of importance, products produced, facilities, management, and finances.

10. The method of claim 8, wherein the step of displaying buyer information to the selected seller, if the seller receives an electronic request from the buyer, further comprises displaying a third level of buyer information to the seller, if the buyer requests electronically the fourth level of seller information.

11. The method of claim 10, wherein the step of displaying the requested seller information to the buyer, if the seller approves of the displayed buyer information and provides the buyer authorization, further comprises displaying the fourth level of seller information to the buyer, if the seller has provided the buyer authorization.

12. The method of claim 10, wherein the step of automatically sending an electronic request for more information from the selected seller according to a buyer's request for more information, further comprises sending an electronic request for the selected seller's identity and wherein the step of displaying the requested seller information, further comprises displaying a seller identity to the buyer, if the seller has provided the buyer authorization.

13. A method for allowing buyers and sellers of businesses with computer servers connected via a network, said network comprises a predefined database, to interact without revealing significant information to an interested buyer or seller without proper authorization, said method comprising the steps of:

entering search information by a prospective buyer based on first level of information, wherein the first level of information includes SIC codes, a revenue range and geographical information, wherein said information being previously stored in the database;

searching previously stored information within the database in accordance with the entered information;

displaying the first level of information of the in accordance with the search;

selecting one of the sellers in accordance with the displayed first level of seller information;

displaying a second level of information of the selected seller;

electronically requesting for a third level of information from the selected seller if the prospective buyer requests more information;

displaying first and second levels of buyer information to the selected seller, if the seller receives an electronic request for the third level of seller information, said buyer information being previously stored in the database;

displaying a third level of information to the buyer of the selected seller, if the seller approves of the displayed first and second levels of information and provides the buyer viewing authorization;

executing a confidentiality agreement over the network, if the buyer and seller are interested in viewing more information;

displaying a seller identity to the buyer, if the seller has provided the buyer authorization;

electronically requesting for a fourth level of information from the selected seller according to a buyer's request for more information;

displaying a fourth level of information to the buyer of the selected seller, if the seller is satisfied with the buyer's third level of information and has provided the buyer authorization.

14. The method of claim 13, wherein the first level of information includes at least one of the seller's SIC code, geographic location(s), and revenue and the second level of information includes asset information, business expectations or earning before interest, taxes and depreciation data.

15. The method of claim 13, wherein the third level of information includes at least one of an executive summary, company history, markets of importance, products produced, facilities, management, or finances.

16. The method of claim 13, wherein the fourth level of information includes at least one of a complete business plan or selling memorandum.

17. The method of claim 13, wherein the electronic request is at least one of an electronic facsimile or electronic mail.

18. A system for allowing buyers and sellers of businesses with computer servers connected via a network, said network comprises a predefined database, to interact without revealing significant information to an interested buyer or seller without proper authorization, said system comprising:

a means for entering search information by a prospective buyer based on a first level of information, wherein the first level of information includes SIC codes, a revenue range and geographical information and the first level of information being previously stored in the database;

a means for automatically searching previously stored seller information within the database in accordance with the buyer entered information and presenting to the buyer the first level of one or more seller's information in accordance with the search;

a means for selecting one of the sellers in accordance with the displayed first level of seller information;

a means for presenting a second level of information according to the selected seller;

a means for electronically requesting for a third level of information from the selected seller, if the prospective buyer requests more information;

a means for presenting first and second levels of buyer information to the selected seller, if the seller receives an electronic request for the third level of seller information;

a means for presenting a third level of information to the buyer of the selected seller, if the seller approves of the displayed first and second levels of information and provides the buyer viewing authorization;

a means for executing a confidentiality agreement over the network, if the buyer and seller are interested in viewing more information;

a means for presenting a seller identity to the buyer, if the seller has provided the buyer authorization;

a means for electronically requesting for a fourth level of information from the selected seller according to a buyer's request for more information;

a means for presenting a third level of buyer information to the selected seller, if the seller receives and electronic request for more levels of information; and a means for presenting a fourth level of information to the buyer of the selected seller, if the seller is satisfied with the buyer's third level of information and has provided the buyer authorization.

19. The system of claim 18, wherein the first level of information includes at least one of the seller's SIC code, geographic location(s), or revenue and the second level of information includes at least one of asset information, business expectations or earning before interest, taxes and depreciation data.

20. The system of claim 18, wherein the third level of information includes at least one of an executive summary, company history, markets of importance, products produced, facilities, management, or finances.

21. The system of claim 18, wherein the fourth level of information includes at least one of a complete business plan or selling memorandum.

22. The system of claim 18, wherein the electronic request is at least one of an electronic facsimile or electronic mail.

* * * * *